(12) United States Patent
Rementer

(10) Patent No.: US 9,546,779 B2
(45) Date of Patent: Jan. 17, 2017

(54) UNIVERSAL ADAPTABLE HEAD LIGHT EMISSION APPARATUS

(71) Applicant: Jared J. Rementer, New Port Richey, FL (US)

(72) Inventor: Jared J. Rementer, New Port Richey, FL (US)

( * ) Notice: Subject to any disclaimer, the term of this patent is extended or adjusted under 35 U.S.C. 154(b) by 115 days.

(21) Appl. No.: 14/594,826

(22) Filed: Jan. 12, 2015

(65) Prior Publication Data

US 2015/0198313 A1 Jul. 16, 2015

Related U.S. Application Data

(60) Provisional application No. 61/926,566, filed on Jan. 13, 2014.

(51) Int. Cl.

| G02C 11/04 | (2006.01) |
|---|---|
| F21L 4/02 | (2006.01) |
| F21V 21/084 | (2006.01) |
| F21V 23/04 | (2006.01) |
| F21V 23/00 | (2015.01) |
| F21V 21/088 | (2006.01) |

(52) U.S. Cl.
CPC ........... *F21V 21/084* (2013.01); *F21V 23/001* (2013.01); *F21V 23/0414* (2013.01); *G02C 11/04* (2013.01); *F21L 4/02* (2013.01); *F21V 21/0885* (2013.01); *F21Y 2107/20* (2016.08); *F21Y 2107/70* (2016.08)

(58) Field of Classification Search
CPC .. F21V 21/084; F21V 21/0885; F21V 23/001; F21V 23/0414; F21L 4/02; G02C 11/04; F21Y 2107/20; F21Y 2107/70
See application file for complete search history.

(56) References Cited

U.S. PATENT DOCUMENTS

| 3,350,552 A | * | 10/1967 | Lawrence | F21L 14/00 351/158 |
|---|---|---|---|---|
| 5,836,673 A | * | 11/1998 | Lo | A41D 13/01 362/103 |
| 6,764,194 B1 | * | 7/2004 | Cooper | F21V 21/084 362/103 |
| 6,974,226 B2 | * | 12/2005 | Chang | F21V 21/0965 362/103 |
| 7,661,818 B2 | * | 2/2010 | Waters | F21V 21/084 351/158 |
| 8,579,478 B2 | * | 11/2013 | Cristoforo | A42B 3/04 362/106 |
| 2007/0013864 A1 | * | 1/2007 | Dietz | G02C 11/00 351/155 |

* cited by examiner

*Primary Examiner* — Alan Cariaso

(57) ABSTRACT

A universally adaptable head light emission apparatus emits light outward from a user's face when implemented to illuminate an area in front of the user. The universally adaptable head light emission apparatus consists of a bridge light assembly, a pair of temple light assemblies, a bridge fastener and a plurality of interchangeable temple fasteners mounted onto a flexible elongated conduit. The universally adaptable head light emission apparatus mounts to safety glasses, prescription glasses, or directly onto the head of a user through the bridge fastener and the plurality of interchangeable fasteners. The bridge fastener and the plurality of interchangeable fasteners are selected depending on the mounting means necessary. The bridge light assembly and the pair of temple light assemblies are powered by a portable power supply to emit light outward from the user.

16 Claims, 11 Drawing Sheets

UNIVERSAL ADAPTABLE HEAD LIGHT EMISSION APPARATUS

The current application claims a priority to the U.S. Provisional Patent application Ser. No. 61/926,566 filed on Jan. 13, 2014.

FIELD OF THE INVENTION

The present invention relates generally to a universally adaptable light emission device. More specifically, the present invention is an illuminating device capable of being fastened to a multitude of different eye wear designs in addition to directly being worn on the head without support from an external apparatus.

BACKGROUND OF THE INVENTION

Working with two hands while in dark areas, in tight spots, under vehicles and odd environments one does not always have access to an illuminating apparatus such as a flashlight, a glow stick, or a head lamp. The present invention is targeted towards occupations and hobbies that require hands on applications. For example handyman, building superintendent, automotive mechanic, construction engineer, machinist, hobbyist, carpenter, and plumber. All of these professions require delicate and precise handiwork under various conditions. One of the main limitations that these professionals face is the lack of proper lighting. When removing small components from the engine underneath a car or installing bamboo based hardwood flooring, one of the most critical aspects is the lighting. Proper lighting ensures that the job is completed with the utmost precision and quality. Not only is proper lighting essential to the quality of the work, it is also a key safety precaution. For instance, a plumber might injure their hand while hammering or drilling due to improper lighting or a carpenter may accidentally cut him or herself when sawing a piece of wood or metal, again because of insufficient lighting. To prevent these situations, most workers use auxiliary lighting devices in the form of a standing or hanging light fixture. These devices are powerful and produce more than enough illumination, but are limited in their mobility and produce unwanted shadows. Head lamps do exist on today's market that are allow for greater mobility, but if the user wears goggles or glasses as well, as the majority of users do, the head lamp interferes and result in need of frequent and cumbersome readjustments.

The present invention seeks to provide a product which provides direct and powerful illumination with the ability to be fastened to a variety of eyewear designs. In addition, the present invention is able to be attached to the forehead of a person without the aid of eyewear frames resulting in an alternative design for a head lamp.

DETAIL DESCRIPTIONS OF THE INVENTION

All illustrations of the drawings are for the purpose of describing selected versions of the present invention and are not intended to limit the scope of the present invention.

The present invention relates generally to a light emitting apparatus compatible with various eyewear designs. The present invention may be utilized as a retrofit attachment or a stand-alone lighting accessory. The preferred application of the present invention relates generally to improving eye protection devices such as safety goggles and glasses.

Figure 1:
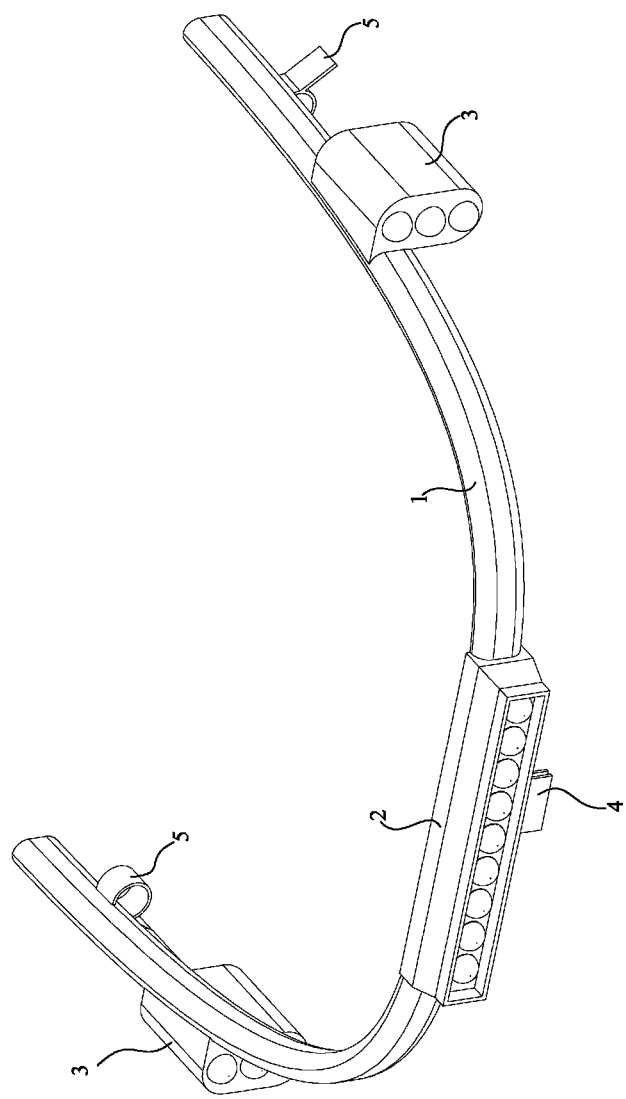
FIG. 1 is a perspective view of the present invention.

As shown in FIG. 1, the present invention comprises an elongated conduit 1, a bridge light assembly 2, a pair of temple light assemblies 3, a bridge fastener 4, and a plurality of interchangeable temple fasteners 5. The elongated conduit 1 provides a mounting point for the bridge light assembly 2 and the pair of temple light assemblies 3 and provides a housing which allows the electrical components of the present invention to be connected through. The elongated conduit 1 is either mounted onto glasses, safety or prescription, or able to be directly worn on the head of the user. The elongated conduit 1 is flexible such that the present invention is able to conform to different shapes of glasses and head types. The bridge light assembly 2 and the pair of temple light assemblies 3 emit light outward from the user when the present invention is implemented to increase vision in low light situations. The bridge fastener 4 attaches the present invention to the pair of glasses or the bridge of a user's nose in the embodiment where the present invention does not attach to a user's glasses, as shown in FIG. 1 to FIG. 3, FIG. 5 and FIG. 6. The bridge fastener 4 is preferably to be a spring loaded clamp; however, the bridge fastener 4 can also be, but is not limited to, the spring loaded clamp, a zip tie, a clasp, or other appropriate means of attachment to attach to a pair of glasses and preferred to be a nose clip when mounted onto the bridge of a user's nose. The plurality of interchangeable temple fasteners 5 attaches the present invention to the temples of a pair of glasses to provide stability or allow the present invention to be directly attached to the head of the user.

The bridge light assembly 2 is centrally mounted along the elongated conduit 1 between the pair of temple light assemblies 3 to provide a balanced light emission when the present invention is implemented in accordance to FIG. 1 to FIG. 4. The pair of temple light assemblies 3 is similarly mounted onto the elongated conduit 1. The bridge light assembly 2 is positioned between the pair of temple light assemblies 3. When the present invention is mounted onto the head or glasses of the user the pair of temple light assemblies 3, the pair of temple light assemblies 3 aligns to the user's temples and outwardly emits light in the direction the user is facing. The bridge fastener 4 is mounted on the elongated conduit 1, adjacent to the bridge light assembly 2, such that the present invention easily mounts onto the bridge of a pair glasses.

The plurality of interchangeable temple fasteners 5 comprises a first selected fastener 9 and a second selected fastener 10. The plurality of interchangeable temple fasteners 5 is a collection of different types of fasteners, which can be used to connect to the temple portions of specific eyewear or the head of the user. The first selected fastener 9 and the second selected fastener 10 are attached along the elongated conduit 1 and opposite to each other. The first selected fastener 9 and the second selected fastener 10 are selected from the plurality of interchangeable temple fasteners 5. The bridge light assembly 2 is positioned between the first selected fastener 9 and the second selected fastener 10, so that the first selected fastener 9 and the second selected fastener 10 can evenly support the bridge light assembly. The first selected fastener 9 and the second selected fastener 10 are selected from a group consisting of adhesive tape, magnets, cable ties, clamps, grooves or compressive wires. The compressive wires are similar to the temples of sunglasses which secure the sunglasses to the head of the wearer through compressive force. The preferred fastener for the first selected fastener 9 and the second selected fastener 10 is reusable cable ties which allow for various sizes and shapes of glasses temples to be compatible with the present invention.

Figure 6:
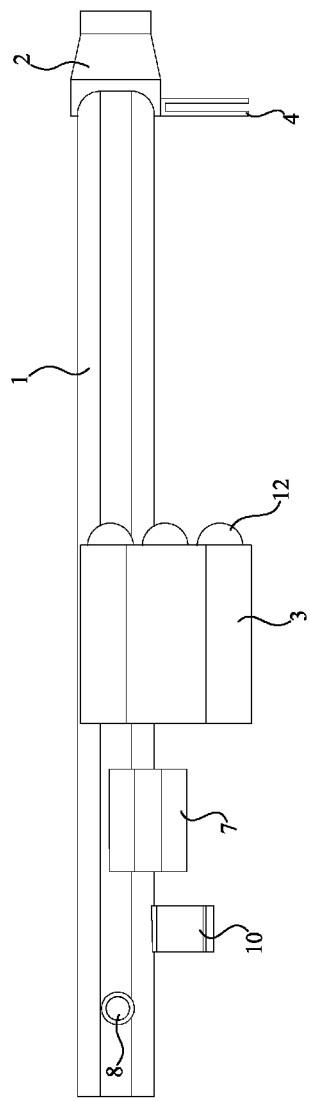
FIG. 6 is a right view of the present invention.
Figure 7:
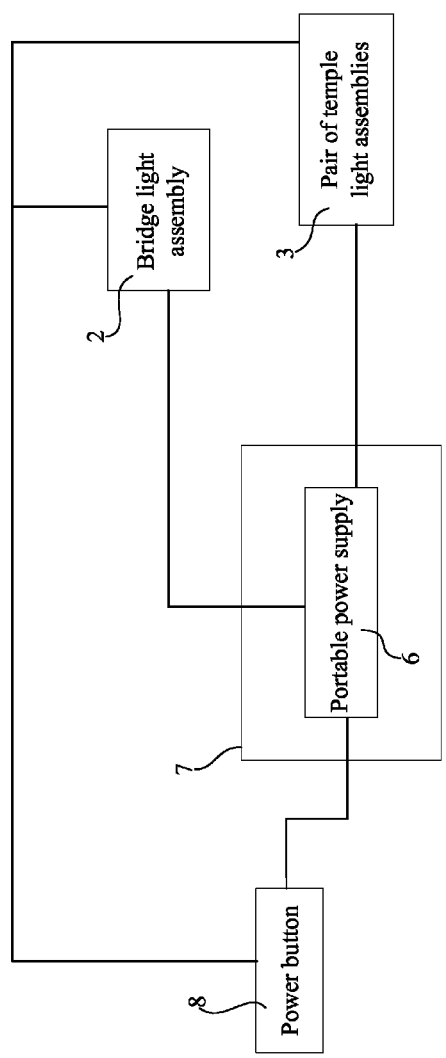
FIG. 7 is a schematic of the electrical components of the present invention.
Figure 8:
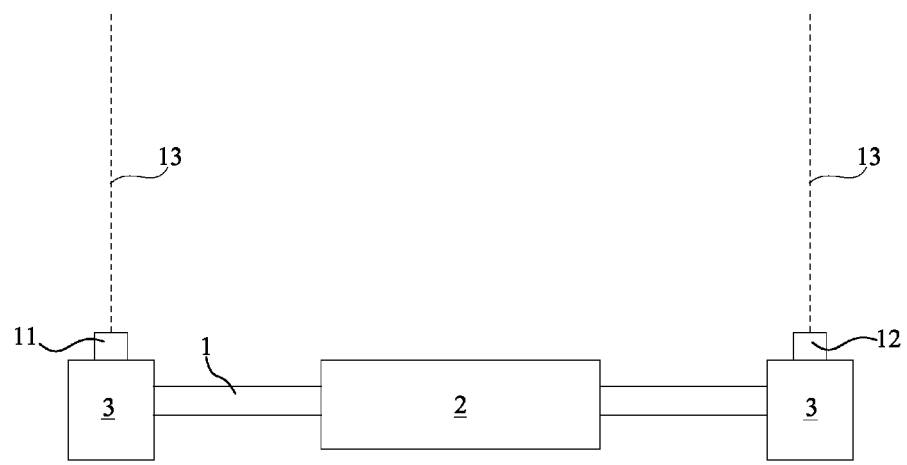
FIG. 8 is a top schematic view of the present invention showing the light emission direction for the left temple light array and the light emission direction for the right temple light array in a parallel orientation.
Figure 9:
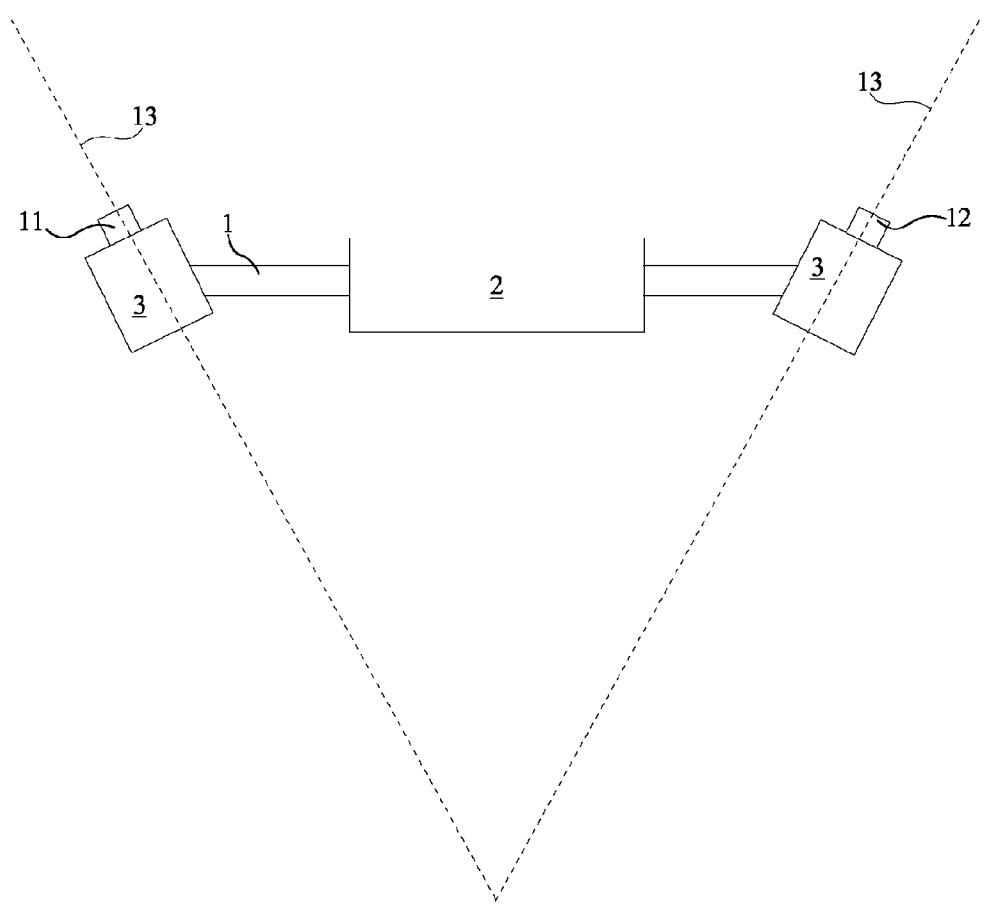
FIG. 9 is a top schematic view of the present invention showing the light emission direction for the left temple light array and the light emission direction for the right temple light array in at an acute angle.
Figure 10:
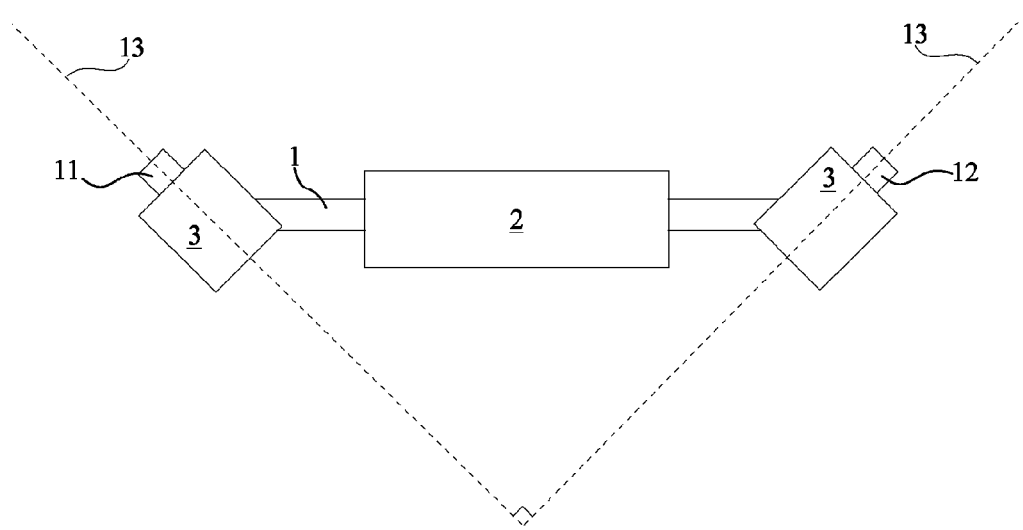
FIG. 10 is a top schematic view of the present invention showing the light emission direction for the left temple light array and the light emission direction for the right temple light array in a perpendicular orientation.
Figure 11:
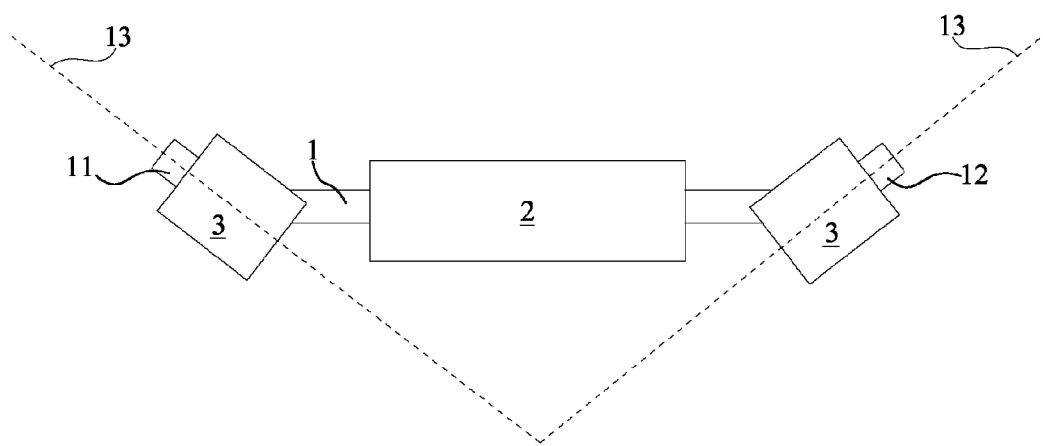
FIG. 11 is a top schematic view of the present invention showing the light emission direction for the left temple light array and the light emission direction for the right temple light array at an obtuse angle.

The present invention further comprises a portable power supply 6, a battery compartment 7, and a power button 8, detailed in FIG. 7. The portable power supply 6 is a rechargeable or replaceable battery which provides power to the bridge light assembly 2 and the pair of temple light assemblies 3. The battery compartment 7 houses the portable power supply 6 and is mounted onto the elongated conduit 1, as the portable power supply 6 is positioned within the battery compartment 7. The power button 8 is similarly mounted onto the elongated conduit 1 and allows the user to toggle the emission of light from the bridge light assembly 2 and the pair of temple light assemblies 3, as shown in FIG. 6. The power button 8, the bridge light assembly 2 and the pair of temple light assemblies 3 are electrically connected to the portable power supply 6 through the elongated conduit 1, creating a circuit within the elongated conduit 1. When the circuit is closed, the portable powers supply provides power to the bridge light assembly 2 and the pair of temple light assemblies 3; therefore, illuminating an area in front of the user. Although described as a button, the power button 8 may include a toggle, switch, or similar means of changing between two discrete configurations of an electrical circuit.

Figure 2:
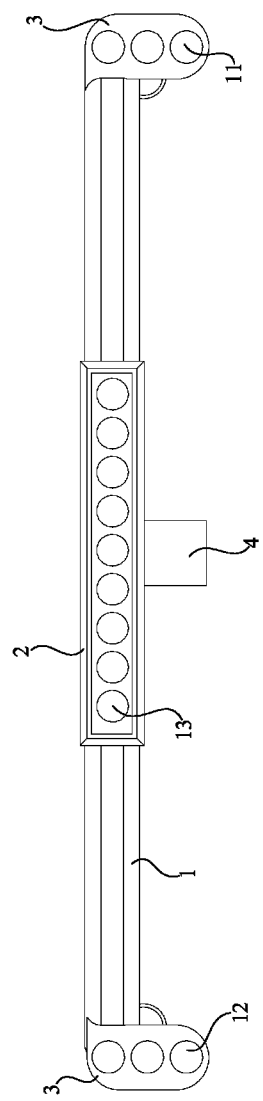
FIG. 2 is a front view of the present invention.
Figure 3:
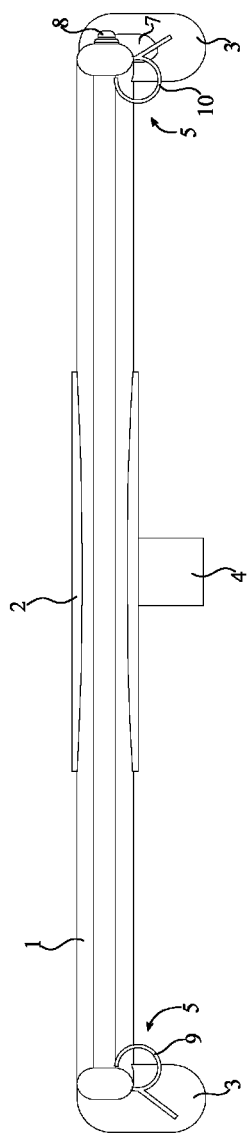
FIG. 3 is a rear view of the present invention.
Figure 4:
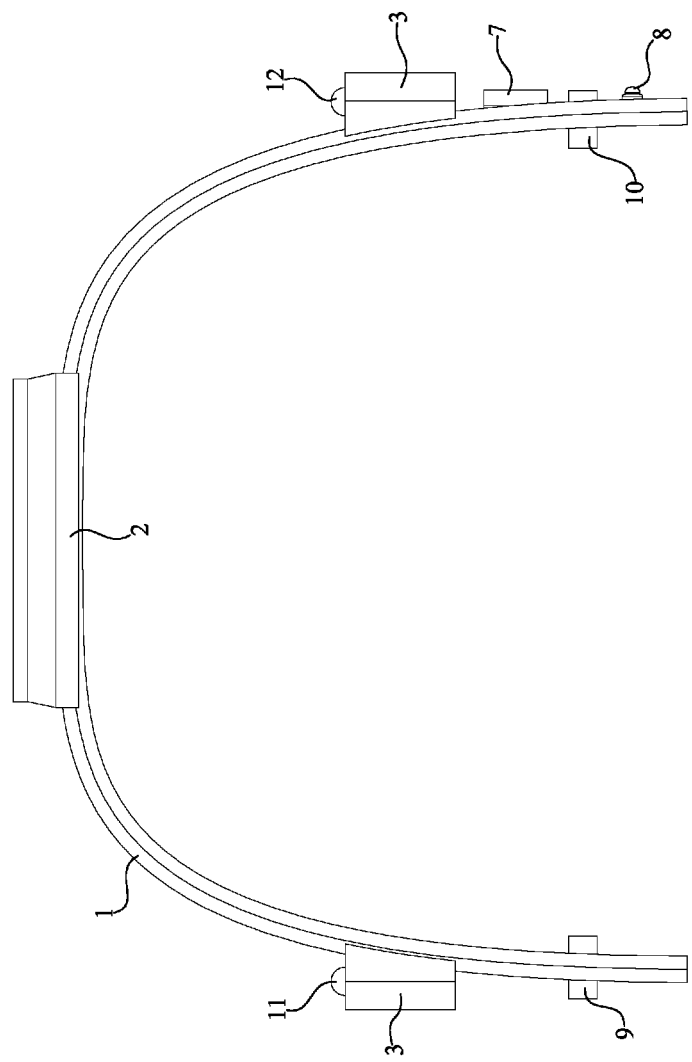
FIG. 4 is a top view of the present invention.
Figure 5:
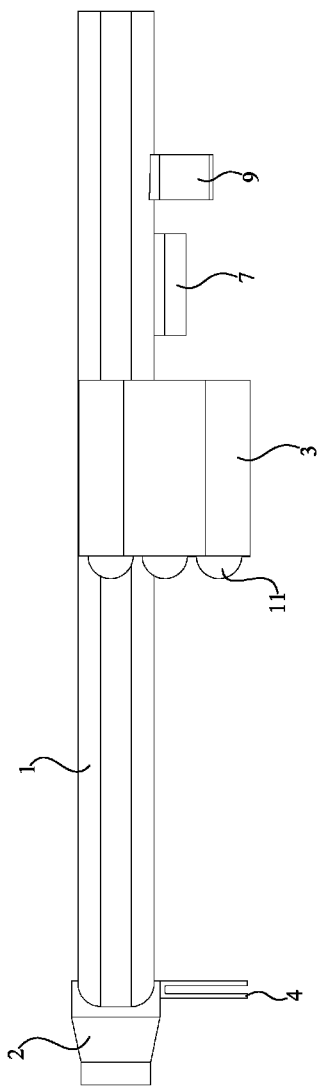
FIG. 5 is a left view of the present invention.

Further, the pair of temple light assemblies 3 comprises a left temple light array 11 and a right temple light array 12 and the bridge light assembly 2 comprises a bridge light array 13, in accordance to FIG. 2. The left temple light array 11 and the right temple light array 12 are preferred to be a 3×1 or 4×1 matrix of light emitting diode (LED) elements such that the light elements are in a single column. The bridge light array 13 is preferred to be a 1×9 matrix of LED light elements, such that the light elements are in a single row. The rows and columns for intensive purposes are defined as horizontal and vertical, respectively, to the head of the user when the present invention is worn by the user. Thus, the left temple light array 11 and the right temple light array 12 are positioned parallel to each other and perpendicular to the bridge light assembly 2.

The left temple light array 11 and the right temple light array 12 radiate their light in a light emission direction. Each light emission direction is oriented in a way to illuminate an area in front and peripheral of the user to increase vision in low light situations. The light emission direction for the left temple light array 11 and the light emission direction for the right temple light array 12 are oriented parallel, at an acute angle, at a right angle, at an obtuse angle, or at a straight angle to each other. These orientations may be used for various applications depending on the necessary peripheral vision needed for the application of the present invention.

Although the invention has been explained in relation to its preferred embodiment, it is to be understood that many other possible modifications and variations can be made without departing from the spirit and scope of the invention as hereinafter claimed.

What is claimed is:

1. A universally adaptable head light emission apparatus comprises:
    an elongated conduit;
    a bridge light assembly;
    a pair of temple light assemblies;
    a bridge fastener;
    a plurality of interchangeable temple fasteners;
    the plurality of interchangeable temple fasteners comprises a first selected fastener and a second selected fastener;
    the bridge light assembly being centrally mounted along the elongated conduit;
    the pair of temple light assemblies being mounted onto the elongated conduit;
    the bridge light assembly being positioned between the pair of temple light assemblies;
    the bridge fastener being mounted on the elongated conduit, adjacent to the bridge light assembly;
    the first selected fastener and second selected fastener being attached along the elongated conduit and opposite to each other;
    the bridge light assembly being positioned in between the first selected fastener and second selected fastener;
    the pair of temple light assemblies comprises a left temple light array and a right temple light array;
    the bridge light assembly comprises a bridge light array;
    the left temple light array and the right temple light array being positioned parallel to each other; and
    the left temple light array and the right temple light array being positioned perpendicular to the bridge light array.

2. The universally adaptable head light emission apparatus as claimed in claim 1, wherein the elongated conduit is flexible;
    a portable power supply;
    a battery compartment;
    a power button;
    the battery compartment and the power button being mounted onto the elongated conduit;
    the portable power supply being positioned within the battery compartment; and
    the power button, the bridge light assembly and the pair of temple light assemblies being electrically connected to the portable power supply through the elongated conduit.

3. The universally adaptable head light emission apparatus as claimed in claim 1, comprises:
    a light emission direction for the left temple light array and a light emission direction for the right temple light array being oriented with each other at an acute angle.

4. The universally adaptable head light emission apparatus as claimed in claim 1, comprises:

a light emission direction for the left temple light array and a light emission direction for the right temple light array being oriented with each other at a right angle.

5. The universally adaptable head light emission apparatus as claimed in claim 1, comprises:
a light emission direction for the left temple light array and a light emission direction for the right temple light array being oriented with each other at an obtuse angle.

6. The universally adaptable head light emission apparatus as claimed in claim 1, comprises:
a light emission direction for the left temple light array and a light emission direction for the right temple light array being oriented with each other at a straight angle.

7. The universally adaptable head light emission apparatus as claimed in claim 1, wherein the elongated conduit is flexible.

8. The universally adaptable head light emission apparatus as claimed in claim 1, wherein the bridge fastener is a spring loaded clamp.

9. A universally adaptable head light emission apparatus comprises:
an elongated conduit;
a bridge light assembly;
a pair of temple light assemblies;
a bridge fastener;
a plurality of interchangeable temple fasteners;
the plurality of interchangeable temple fasteners comprises a first selected fastener and a second selected fastener;
the pair of temple light assemblies comprises a left temple light array and a right temple light array;
the bridge light assembly comprises a bridge light array;
the bridge light assembly being centrally mounted along the elongated conduit;
the pair of temple light assemblies being mounted onto the elongated conduit;
the bridge light assembly being positioned between the pair of temple light assemblies;
the bridge fastener being mounted on the elongated conduit, adjacent to the bridge light assembly;
the first selected fastener and second selected fastener being attached along the elongated conduit and opposite to each other;
the bridge light assembly being positioned in between the first selected fastener and second selected fastener;
the left temple light array and the right temple light array being positioned parallel to each other; and
the left temple light array and the right temple light array being positioned perpendicular to the bridge light array.

10. The universally adaptable head light emission apparatus as claimed in claim 9, wherein the elongated conduit is flexible;
a portable power supply;
a battery compartment;
a power button;
the battery compartment and the power button being mounted onto the elongated conduit;
the portable power supply being positioned within the battery compartment; and
the power button, the bridge light assembly and the pair of temple light assemblies being electrically connected to the portable power supply through the elongated conduit.

11. The universally adaptable head light emission apparatus as claimed in claim 9, comprises:
the pair of temple light assemblies comprises a left temple light array and a right temple light array; and
a light emission direction for the left temple light array and a light emission direction for the right temple light array being oriented with each other at an acute angle.

12. The universally adaptable head light emission apparatus as claimed in claim 9, comprises:
the pair of temple light assemblies comprises a left temple light array and a right temple light array; and
a light emission direction for the left temple light array and a light emission direction for the right temple light array being oriented with each other at a right angle.

13. The universally adaptable head light emission apparatus as claimed in claim 9, comprises:
the pair of temple light assemblies comprises a left temple light array and a right temple light array; and
a light emission direction for the left temple light array and a light emission direction for the right temple light array being oriented with each other at an obtuse angle.

14. The universally adaptable head light emission apparatus as claimed in claim 9, comprises:
the pair of temple light assemblies comprises a left temple light array and a right temple light array; and
a light emission direction for the left temple light array and a light emission direction for the right temple light array being oriented with each other at a straight angle.

15. The universally adaptable head light emission apparatus as claimed in claim 9, wherein the elongated conduit is flexible.

16. The universally adaptable head light emission apparatus as claimed in claim 9, wherein the bridge fastener is a spring loaded clamp.

* * * * *